Patented Apr. 10, 1923.

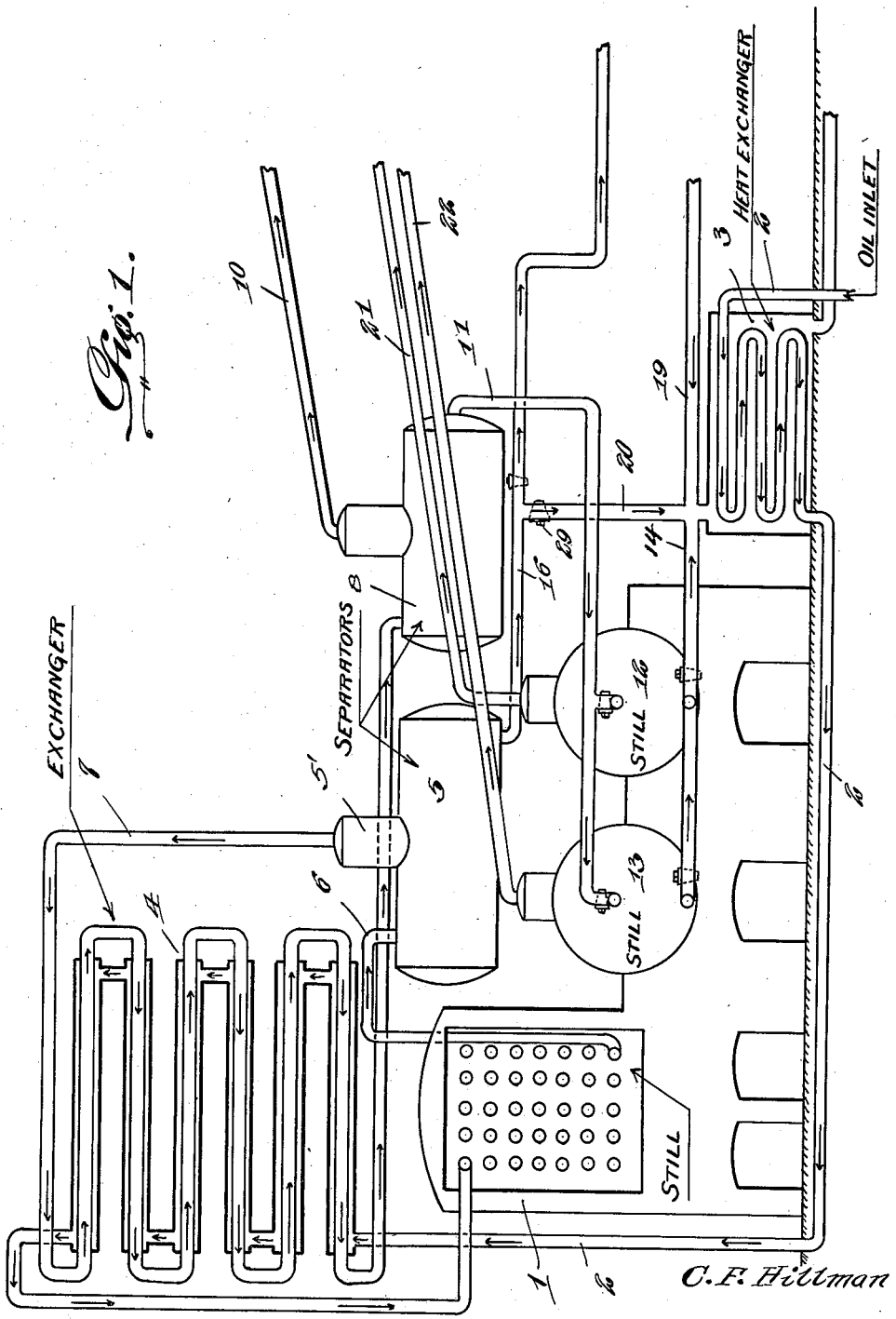

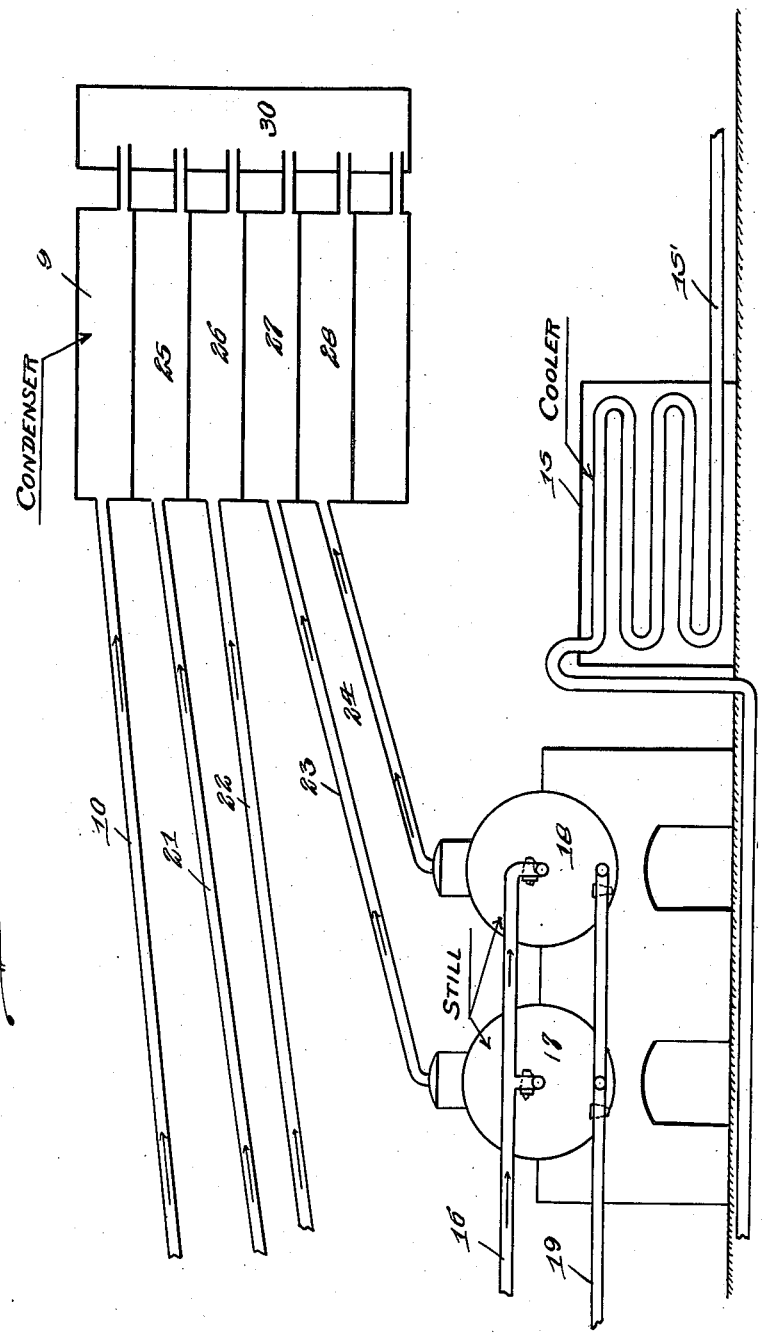

1,451,574

UNITED STATES PATENT OFFICE.

CHARLES FRED HILLMAN, OF WICHITA FALLS, TEXAS.

OIL-REFINING DEVICE.

Application filed March 13, 1920. Serial No. 365,554.

*To all whom it may concern:*

Be it known that I, CHARLES F. HILLMAN, a citizen of the United States, residing at Wichita Falls, in the county of Wichita and State of Texas, have invented new and useful Improvements in Oil-Refining Devices, of which the following is a specification.

This invention relates to an oil refining apparatus and the principal object of the invention is to provide means for taking out the various operations of distilling crude oil in one continuous operation and to utilize the heat of the oil to effect the various changes necessary to separate the desired products from the crude oil, thus effecting a saving of fuel and completing the process in the minimum amount of time.

Another object of the invention is to eliminate re-running of the oils thus doing away with pumping apparatuses for charging re-run stills and also reducing the number of tanks and also reducing the quantity of water required for condensing purposes.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic view of one half of the apparatus.

Figure 1ª is a like view of the other half.

In these views 1 indicates a pipe still to which the crude oil is pumped, by any suitable form of pump, through the piping 2. Before reaching the still the crude oil is passed through the heat exchangers 3 and 4 so that the oil in said piping will be heated by the hot vapors and oils passing through the exchangers in an opposite direction from the oil passing through the piping 2. The heated oil and vapors pass from the pipe still to the separator 5 by way of the pipe 6: The vapors will pass from the dome 5' of the separator through the pipe 7 which conducts the vapors through the oil pipes of the exchanger 4 so that the heat from these vapors will be taken up by the oil on its way to the still, thus cooling the vapors. After passing through the exchanger 4 the vapors are led to the separator 8 which is connected to the condenser 9 by the piping 10. The condensed oils in the separator 8 flow by gravity to the pipe line 11 to the stills 12 and 13, for further distillation and the residues from these stills 12 and 13 are withdrawn through pipe line 14. After leading the material through the exchanger 3 it passes through the cooling box 15 and the extension 15' of this line being connected with the pump. The unvaporized oil from the separator 5 flows by gravity through pipe line 16 to stills 17 and 18 for further distillation, and the residue from these stills is withdrawn by the pipe line 19, which is connected with the line 14 where the same passes into the exchanger 3. A by-pass 20 may connect the line 16 with the exchanger 3 so as to cut out the stills 17 and 18. The stills 12 and 13 and 17 and 18 are connected by the vapor lines 21, 22, 23 and 24 to the condensers 25, 26, 27, and 28. The pumping out lines and the by-pass are provided with suitable valves as at 29 for closing these lines when desired. The condenser boxes are connected with the receiving house 30 in the well known manner.

It will thus be seen that the various distilling operations are carried out in the one apparatus and in one continuous operation and by using the heated oils and vapors to heat the incoming crude oil a great saving of fuel is effected. The cold oil will also cool the vapor to condense the same and thus the minimum amount of water for cooling purposes is used.

In the exchanger 4 the crude oil on its way to the pipe still is heated by the vapors from the separator 5 so that said vapors are condensed and cooled before they reach the separator 8 and the uncondensed vapors pass from the separator 8 to the condenser 9. The remaining distillate discharges from the separator 8 to the stills 12 and 13 at a comparatively high temperature so that but a minimum amount of fuel is necessary to distill the kerosene vapors in said stills, which passes to the condensers 25 and 26 by the lines 21 and 22.

I claim that my apparatus will produce gasoline, kerosene, gas oil, wax oil and fuel oil, in a continuous operation and that the saving in fuel is 40% and that 20% less water is required for condensing purposes; that all re-running is eliminated, and all pumping incident to charging re-run stills is eliminated; requiring less pumps and less tanks. The construction of the apparatus costs about the same as ordinary refinery construction.

It will be understood that the exchangers 3 and 4 and also the separators 5 and 8 are insulated to retain the heat where desired, and that the apparatus is properly designed and proportioned to effect the desired results in each compartment of the apparatus.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An apparatus of the class described comprising a pipe still, a pair of separators, a pipe line connecting the pipe still with one of said separators, a vapor pipe line connecting said separator with the other separator, a pump line for delivering the crude oil to the pipe still, portions of said line enclosing portions of the vapor line, a condenser connected with the second separator, a pair of stills, a pipe connecting the second separator with said stills so that the oil will flow to said stills by gravity, a pair of condensers connected with said pair of stills, a second pair of stills, a pipe line connecting the same with the first separator so that the oil will flow into said stills by gravity, a pumping out line connected with the bottoms of said pairs of stills, valves in said discharging lines, a by-pass pipe connecting the line leading from the first separator with the pumping out line to cut out the second pair of stills, a valve in said by-pass and means for exchanging the heat of the oil in said pumping out line with the crude oil on its way to the pipe still.

In testimony whereof I affix my signature.

CHARLES FRED HILLMAN.